Patented Apr. 20, 1943

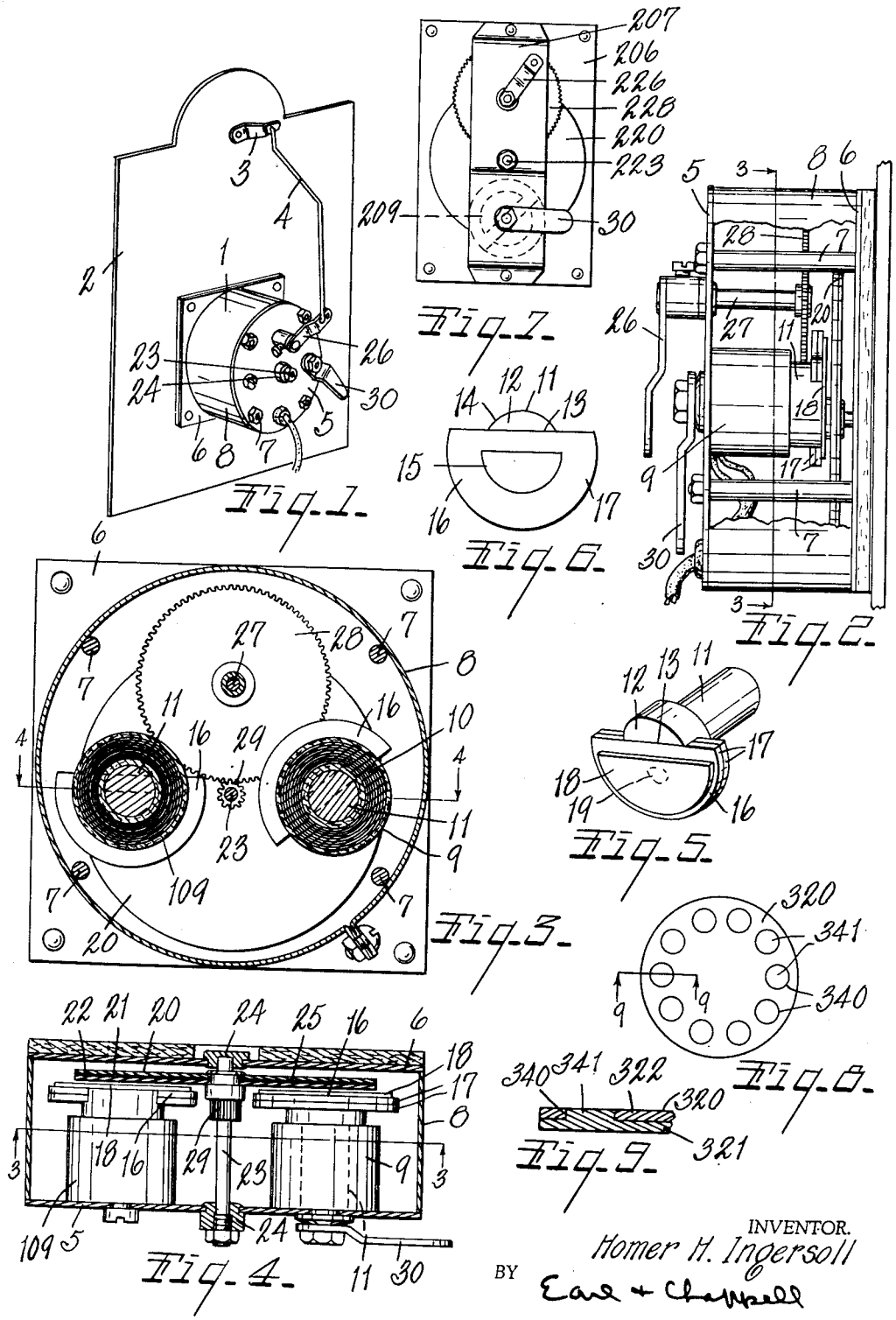

2,316,960

UNITED STATES PATENT OFFICE 2,316,960

MOTOR

Homer H. Ingersoll, Kalamazoo, Mich., assignor to Kalasign Company of America, Kalamazoo, Mich.

Application August 3, 1940, Serial No. 350,417

1 Claim. (Cl. 172—278)

This invention relates to improvements in motors.

This invention relates to alternating current motors and particularly to induction disk motors of the shaded pole type.

It has for its objects:

First, to provide a new and improved alternating current motor.

Second, to provide such a motor in which for a given size and given input, a greatly increased torque is obtained.

Third, to provide such a motor which can be made simply and inexpensively and in which the speed and direction of rotation may be easily regulated.

Fourth, to provide such a motor which has the characteristics of a synchronous motor.

Fifth, to provide such a motor with a new and improved stator.

Other objects and advantages pertaining to details and economies of construction and operation will appear from the description to follow. The invention is defined in the claim. Preferred embodiments of my invention are illustrated in the accompanying drawing, in which:

Fig. 1 is a perspective view of the back of an animated display with my motor mounted thereon.

Fig. 2 is a detail view with a portion of the casing broken away, showing the operating parts of my motor.

Fig. 3 is a detail sectional view taken on the line 3—3 of Figs. 2 and 4.

Fig. 4 is a detail sectional view taken on line 4—4 of Fig. 3.

Fig. 5 is a perspective view of the core of the stator.

Fig. 6 is a view of the core of the stator showing how the shading coil is positioned.

Fig. 7 is a back view of a slightly modified form of my motor in which only one stator is employed.

Fig. 8 is a detail view of a rotor suitable for use in one of my motors, to give it the characteristics of a synchronous motor.

Fig. 9 is a detail sectional view on line 9—9 of Fig. 8.

My improved motor 1 is shown in Fig. 1 attached to the back of an animated display 2 and connected to the actuating lever 3 thereof by a link 4. The motor is a shaded pole induction disk motor and it has a frame consisting of a pair of plates 5 and 6 connected by suitable posts 7 and surrounded by a suitable enclosing casing 8. The stator 9 of the motor consists of a suitable coil 10 adapted to be energized by alternating current. Mounted within the coil is an iron core 11, the face 12 of which is grooved at 13 to divide the face into two areas 14 and 15. I prefer to have the larger area 15 more than twice as large as the area 14, although the proportions may vary without departing from my invention.

Surrounding the larger area 15 and fitted partially in the groove 13 in the face of the core is a shading coil 16 consisting of a plurality of copper plates 17. Extending from the larger area 15 and extending over the shading coil 16 is an iron extension 18 which is spot-welded on the area 15 as indicated at 19. The rotor 20 of my motor consists of a pair of disks 21 and 22 mounted on a shaft 23 which rotates in bearings 24. The disk rotates in a plane adjacent to and parallel with the plane of the face of the stator as is well shown in Fig. 4.

The disk 21 is of magnetic metal such as soft iron and the disk 22 which lies adjacent the face of the stator is of a conductive non-magnetic metal such as copper or aluminum. The sheets are joined together by a layer 25 of non-conductive adhesive such as shellac.

The take-off from the motor consists of a crank 26 which is keyed to a shaft 27 carrying a gear 28 which meshes with the gear 29 on the shaft 23. This crank arm 26 is connected to the end of the link 4. In the preferred form of my invention, the core 11 is mounted rotatably in the coil 10 and is provided with a suitable arm 30 for rotatably adjusting the same about an axis normal to the disk so that by turning the core which comprises the stator, it is possible to control the speed of the motor and to control the direction of rotation thereof.

If desired, a second stator 109 similar to the stator 9 may be employed. This stator may or may not be rotatable. The one shown in Fig. 4 is not rotatable. This stator is located opposite the stator 9 and gives increased torque to the motor.

In Fig. 7, I show a very simple form of motor with a suitable base 206 and a plate 207 between which the parts of the motor are mounted. The rotor 220 is the same as the rotor 20 and the stator 209 is the same as the stator 9. The arm 226 corresponds to the arm 26 and is driven through a train of gearing including a gear 228 which is driven from the shaft 223 in a manner similar to the driving arrangement shown in Figs. 1-6.

In Fig. 8, I show a modified form of rotor 320.

This rotor consists of a disk 322 of non-magnetic metal such as copper or aluminum. A plurality of apertures 340 equally spaced annularly about the rotor 320 are provided and a layer 321 of iron or other magnetic metal is provided having extensions 341 extending through the apertures 340. When this type of rotor is employed, it is possible to obtain the characteristics of a synchronous motor.

In making up a small motor of any of the types above described and suitable for actuating an animated display, I prefer to use 1/8 inch copper for the disk 22 or 322. I prefer to make the iron disk 1/64 inch thick. The coil 10 may be made of 750 turns of #33 wire, giving 300 ohms resistance, and using 110 volt, 60 cycle current it is possible to develop a torque approximately eight times that which would be developed in the same motor without the iron disk in the rotor arranged as my iron disk is arranged. I believe that this increased torque is due to the fact that the stator, in addition to turning the rotor by induction, also acts magnetically upon the iron disk.

In this application, when I refer to controlling the speed of the motor, it will be apparent that I include also the reversal of the direction of rotation thereof, and that when I refer to the use of iron I have in mind and contemplate including any ferrous metal having suitable magnetic characteristics.

The motors of my invention may be constructed at a minimum of cost. For their size and input they produce relatively large torque when compared with other motors available for use. They can be made much less expensively than other induction disk shaded pole motors because fewer and less bulky parts are employed to give the same torque characteristics. The motors are cool running and do not present any fire risk when employed in operating animated displays.

The terms and expressions which have been herein employed are used as terms of description and not of limitation. There is no intention in the use of such terms and expressions of excluding any equivalents of the features shown and described. It is recognized that various modifications are possible within the scope of the invention claimed.

Having thus described my invention, what I claim as new and desire to secure by Letters Patent is:

In an alternating current motor having a shaded pole stator, a rotor comprising a sheet of non-magnetic metal and a sheet of magnetic metal with an interposed sheet of non-conductive material mounted to rotate with the non-magnetic metal adjacent the stator and the magnetic metal on the side of said non-magnetic metal opposite said stator.

HOMER H. INGERSOLL.